United States Patent
Sanghavi et al.

(10) Patent No.: US 12,347,462 B1
(45) Date of Patent: Jul. 1, 2025

(54) METHODS AND SYSTEMS FOR SEGMENTING VIDEO CONTENT BASED ON SPEECH DATA AND FOR RETREIVING VIDEO SEGMENTS TO GENERATE VIDEOS

(71) Applicant: CIPIO Inc., Mclean, VA (US)

(72) Inventors: Sundeep Sanghavi, Wesley Chapel, FL (US); Jin Yu, Union City, CA (US); Growson Edwards, Leesburg, VA (US); Harshil Shah, Centreville, VA (US)

(73) Assignee: CIPIO Inc., Fairfax, VA (US)

( * ) Notice: Subject to any disclaimer, the term of this patent is extended or adjusted under 35 U.S.C. 154(b) by 0 days.

(21) Appl. No.: 18/800,624

(22) Filed: Aug. 12, 2024

(51) Int. Cl.
  *G11B 27/34* (2006.01)
  *G06F 16/71* (2019.01)
  *G06F 16/75* (2019.01)
  *G06F 40/40* (2020.01)
  *G06V 10/764* (2022.01)
  *G06V 20/40* (2022.01)
  *G11B 27/031* (2006.01)

(52) U.S. Cl.
  CPC ............. *G11B 27/34* (2013.01); *G06F 16/71* (2019.01); *G06F 16/75* (2019.01); *G06F 40/40* (2020.01); *G06V 10/764* (2022.01); *G06V 20/41* (2022.01); *G06V 20/46* (2022.01); *G06V 20/49* (2022.01); *G11B 27/031* (2013.01); *G06V 2201/10* (2022.01)

(58) Field of Classification Search
  CPC ....... G11B 27/34; G11B 27/031; G06F 16/71; G06F 16/75; G06F 40/40; G06V 10/764; G06V 20/41; G06V 20/46; G06V 20/49; G06V 2201/10

USPC .......................................................... 386/241
See application file for complete search history.

(56) References Cited

U.S. PATENT DOCUMENTS

| | | | |
|---|---|---|---|
| 10,733,230 B2 | 8/2020 | Jo | |
| 11,197,036 B2 | 12/2021 | Chao | |
| 11,704,893 B2 * | 7/2023 | Ren | G06V 10/454 |
| | | | 386/241 |
| 12,045,281 B2 | 7/2024 | Lee et al. | |
| 12,079,273 B2 | 9/2024 | Lee et al. | |
| 12,222,985 B2 | 2/2025 | Lee et al. | |

(Continued)

FOREIGN PATENT DOCUMENTS

| | | |
|---|---|---|
| CN | 109922373 A | 6/2019 |
| CN | 111726536 A | 9/2020 |

(Continued)

*Primary Examiner* — Helen Shibru
(74) *Attorney, Agent, or Firm* — COOLEY LLP

(57) ABSTRACT

A method includes receiving a series of video segments and providing the series of video segments as input to a first machine learning model to produce text data. The text data is provided as input to a second machine learning model to produce categorized text data that includes a classification indication. The classification indication is added to metadata of the video segment, and the categorized text data is provided as input to a third machine learning model to produce a semantic vector. The method also includes causing the video segment and the metadata that includes the classification indication to be stored at a location of a database based on the semantic vector, the database being configured to be searched based on a search query associated with the semantic vector.

8 Claims, 7 Drawing Sheets

(56) References Cited

U.S. PATENT DOCUMENTS

| | | | |
|---|---|---|---|
| 2016/0092561 A1* | 3/2016 | Liu | G06F 16/7837 |
| | | | 386/230 |
| 2023/0162502 A1* | 5/2023 | Patel | G06F 18/23 |
| | | | 382/103 |
| 2023/0245451 A1* | 8/2023 | Zhang | G06F 16/7834 |
| | | | 386/241 |
| 2024/0124004 A1* | 4/2024 | Donderici | B60W 60/0015 |
| 2025/0008188 A1* | 1/2025 | Maity | H04N 21/4884 |

FOREIGN PATENT DOCUMENTS

| | | |
|---|---|---|
| CN | 112929744 A | 6/2021 |
| EP | 3598371 A1 | 1/2020 |

* cited by examiner

METHODS AND SYSTEMS FOR SEGMENTING VIDEO CONTENT BASED ON SPEECH DATA AND FOR RETREIVING VIDEO SEGMENTS TO GENERATE VIDEOS

FIELD

One or more embodiments described herein relate to systems and computerized methods for segmenting, storing, retrieving, and arranging video data that includes speech data.

BACKGROUND

In some instances, video production can be expensive, time consuming, and/or require technical expertise. Additionally, in some instances, it can be difficult to organize a large amount of video content to facilitate later use. A need exists, therefore, for systems and computerized methods to automatically segment video data for use in video arrangements.

SUMMARY

According to an embodiment, a method includes receiving, at a processor, a series of video segments and providing, via the processor, the series of video segments as input to a first machine learning model to produce text data. The text data is provided as input, via the processor, to a second machine learning model to produce categorized text data that (1) is a subset of the text data, (2) is associated with a video segment from the series of video segments, and (3) includes a classification indication. Via the processor, the classification indication is added to metadata of the video segment, and the categorized text data is provided as input, via the processor, to a third machine learning model to produce a semantic vector. The method also includes causing, via the processor, the video segment and the metadata that includes the classification indication to be stored at a location of a database based on the semantic vector, the database being configured to be searched based on a search query associated with the semantic vector.

According to an embodiment, a non-transitory, machine-readable medium stores instructions that, when executed by a processor, cause the processor to receive input data and search, based on the input data, a plurality of semantic vectors associated with a plurality of video segments. In response to determining an association between the input data and at least one semantic vector from the plurality of semantic vectors, the instructions cause the processor to select a semantic vector that is (1) from the at least one semantic vector and (2) associated with a video segment from the plurality of video segments, based on a comparison between the input data and metadata that is associated with the video segment and includes a classification indication. The video segment is added to a series of video segments based on the classification indication.

According to an embodiment, a non-transitory, machine-readable medium stores instructions that, when executed by a processor, cause the processor to receive video data and provide the video data as input to at least one first machine learning model to produce text data that includes timestamp data associated with the video data. The instructions also cause the processor to identify verbal text data based on the text data and provide the verbal text data as input to a second machine learning model to produce categorized text data that (1) is a subset of the verbal text data, (2) is associated with a portion of the timestamp data, and (3) includes a classification indication. The categorized text data is provided as input to a third machine learning model to produce a semantic vector, and a video segment is identified within the video data based on the portion of the timestamp data. Additionally, the instructions cause the processor to cause the video segment and the categorized text data to be stored at a location of a database based on the semantic vector, the database being configured to be searched based on a search query associated with the semantic vector and the classification indication to retrieve the video segment.

DETAILED DESCRIPTION

At least some systems and methods described herein relate to large video models (LVMs) configured to automatically (e.g., without human intervention) generate video content based on user input data (e.g., text data, image data, etc.), as described herein. LVMs can be trained based on existing video data, which can include a plurality of video frames, subtitle metadata, and/or audio data. More specifically, machine learning models can generate classification data based on video data and/or segment video data to produce video segments. LVMs can then retrieve the video segments from a data store in response to user input data, and the video segments can be ordered and spliced together based on classification data that indicates an order of the video segments, as described herein.

At least some systems and methods described herein can be used for training and/or education by, for example, creating educational videos that visually demonstrate procedures, explain concepts, etc., and can be deployed via online learning platforms, internal employee training platforms, etc. Alternatively or in addition, at least some systems and methods described herein can be used for advertising (e.g., personalized advertising) by, for example, generating customized advertising videos (e.g., testimonial videos, product-demo videos, etc.) that can highlight products and/or services based on a viewer's previous interactions and/or preferences. Other use cases for at least some systems and methods described herein include, for example, creative prototyping (e.g., to allow creators to visualize and/or refine video concepts before full-scale production, saving compute resources (e.g., by leveraging pre-existing data) as a result), customer engagement (e.g., by generating explainer videos), event recap and/or promotion (e.g., by compiling key moments from an event to produce a concise video, which can have a smaller data size than a video of the full event and can, therefore, conserve memory resources), and/or the like.

Figure 1:
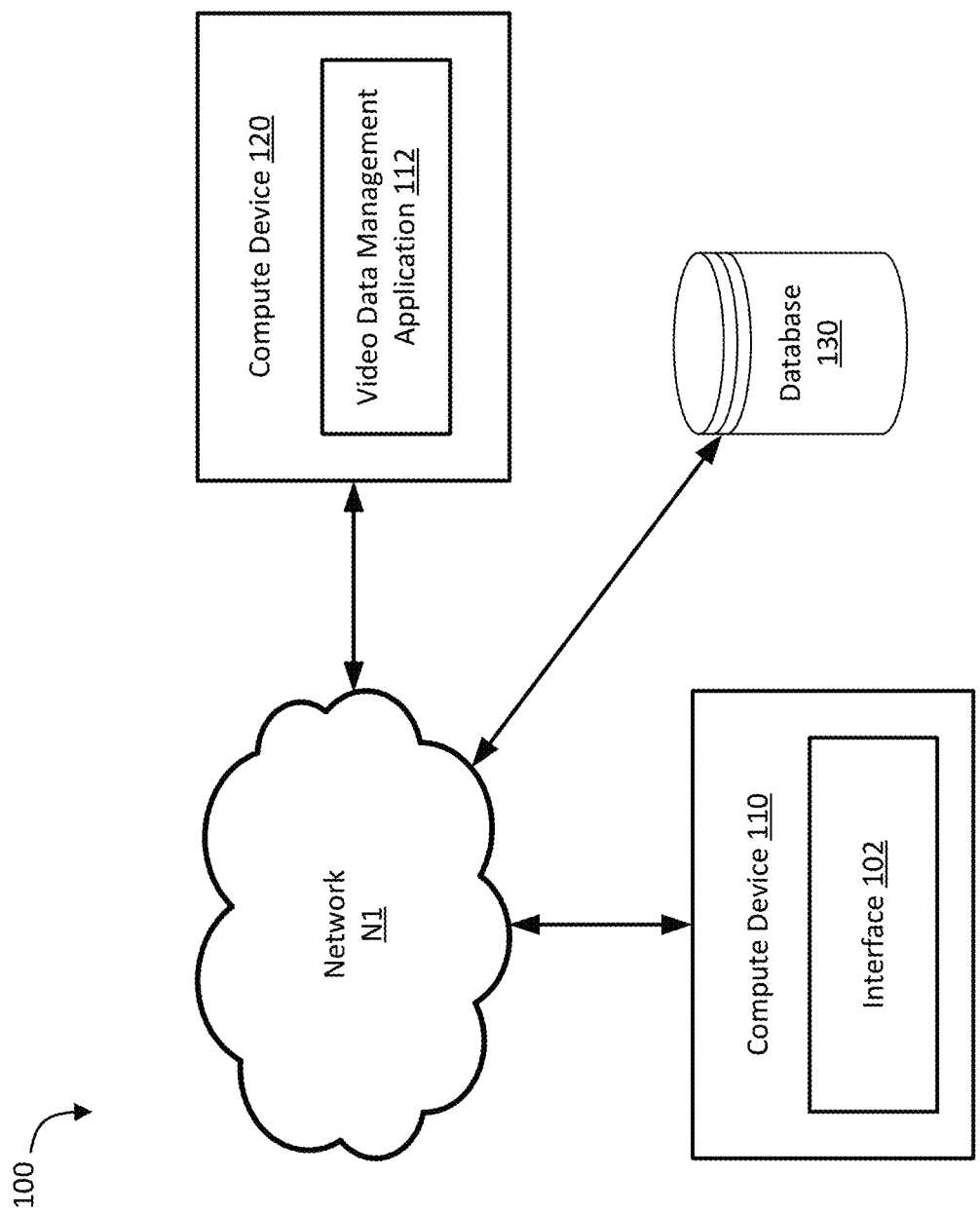
FIG. 1 shows a system block diagram of a video data management system, according to an embodiment.

FIG. 1 shows a system block diagram of a video data management system 100, according to an embodiment. The video data management system 100 includes a compute device 110, a compute device 120, a database 130, and a network N1. The video data management system 100 can include alternative configurations, and various steps and/or functions of the processes described below can be shared among the various devices of the video data management system 100 or can be assigned to specific devices (e.g., the compute device 110, the compute device 120, and/or the like). For example, in some configurations, a user can provide inputs directly to the compute device 120 rather than via the compute device 110, as described herein.

In some embodiments, the compute device 110 and/or the compute device 120 can include any suitable hardware-based computing devices and/or multimedia devices, such as, for example, a server, a desktop compute device, a smartphone, a tablet, a wearable device, a laptop and/or the like. In some implementations, the compute device 110 and/or the compute device 120 can be implemented at an edge node or other remote computing facility/device. In some implementations, each of the compute device 110 and/or compute device 120 can be a data center or other control facility configured to run and/or execute a distributed computing system and can communicate with other compute devices (not shown in FIG. 1).

The compute device 110 can implement a user interface 102. The user interface 102 can be a graphical user interface (GUI) that is structurally and/or functionally similar to an interface 402 of FIG. 4 (described herein) and configured to receive user-defined data and/or display video generated by a video data management application 112 (described further herein). The user interface 102 can be implemented via software (e.g., that is executed via a processor that is functionally and/or structurally similar to the processor 220 of FIG. 2, described herein) and/or hardware.

Figure 2:
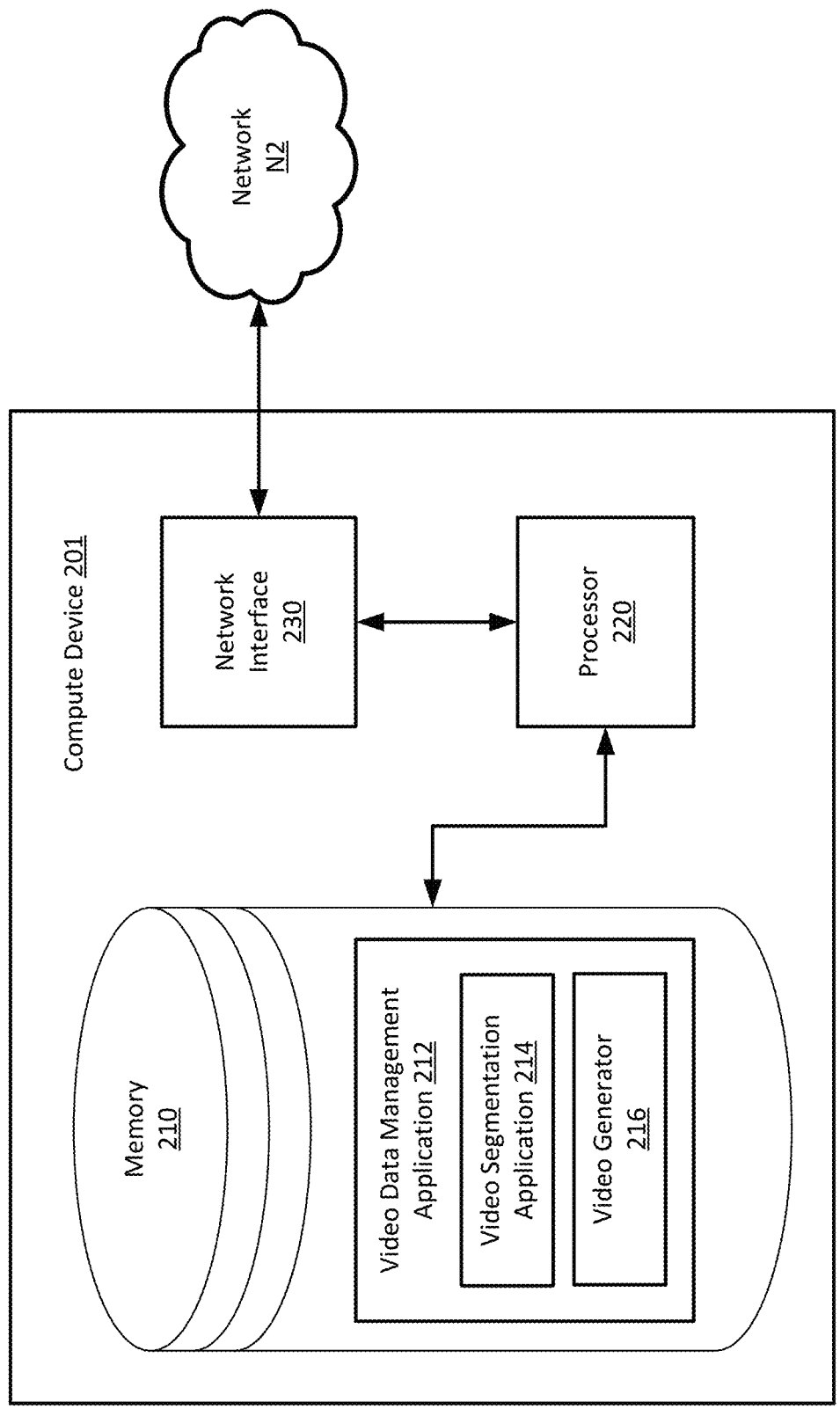
FIG. 2 shows a system block diagram of a compute device included in a video data management system, according to an embodiment.

The compute device 120 can implement a video data management application 112 that is, for example, functionally and/or structurally similar to the video analysis application 212 of FIG. 2. The compute device 120 can be configured to receive input data from the user via the user interface 102 and/or cause display, via the user interface 102, of output data generated by the video data management application 112. The input data can include, for example, text data and/or image data that can be used to retrieve video segment data and aggregate the video segment data to generate video data. The video data management application 112 can be implemented via software and/or hardware.

The database 130 can include at least one memory, repository and/or other form of data storage. The database 130 can be in communication with the compute device 110 and/or the compute device 120 (e.g., via the network N1). In some implementations, the database 130 can be housed and/or included in one or more of the compute device 110, the compute device 120, or a separate compute device(s). The database 130 can be configured to store, for example, video data, video segments, semantic vectors, and/or machine learning models, as described herein.

The database 130 can include a computer storage, such as, for example, a hard drive, memory card, solid-state memory, ROM, RAM, DVD, CD-ROM, write-capable memory, and/or read-only memory. In addition, the database 130 may include a distributed storage system where data is stored on a plurality of different storage devices, which may be physically located at a same or different geographic location (e.g., in a distributed computing system). In some implementations, the database 130 can be associated with cloud-based/remote storage.

The compute device 110, the compute device 120, and the database 130 can be networked and/or communicatively coupled via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s).

In some implementations, although not shown in FIG. 1, the video data management system 100 can include multiple compute devices 110 and/or compute devices 120. For example, in some implementations, the video data management system 100 can include a plurality of compute devices 110, where each compute device 110 can be associated with a different user from a plurality of users. In some implementations, a plurality of compute devices 110 can be associated with a single user, where each compute device 110 can be associated with, for example, a different input modality (e.g., text input, audio input, image input, video input, etc.).

FIG. 2 shows a system block diagram of a compute device 201 included in a video data management system, according to an embodiment. The compute device 201 can be structurally and/or functionally similar to, for example, the compute device 120 of the video data management system 100 shown in FIG. 1. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely located from and operatively coupled with the compute device 201, for example, via the network interface 230. For example, a remote database server can be operatively coupled to the compute device 201.

The memory 210 can store various instructions associated with processes, algorithms and/or data, including machine learning models, as described herein. Memory 210 can further include any non-transitory computer-readable storage medium for storing data and/or software that is executable by processor 220, and/or any other medium that may be used to store information that may be accessed by processor 220 to control the operation of the compute device 201. For example, the memory 210 can store data associated with a video data management application 212. The video data management application 212 can be functionally and/or structurally similar to a video data management application 112 of FIG. 1.

Figure 3:
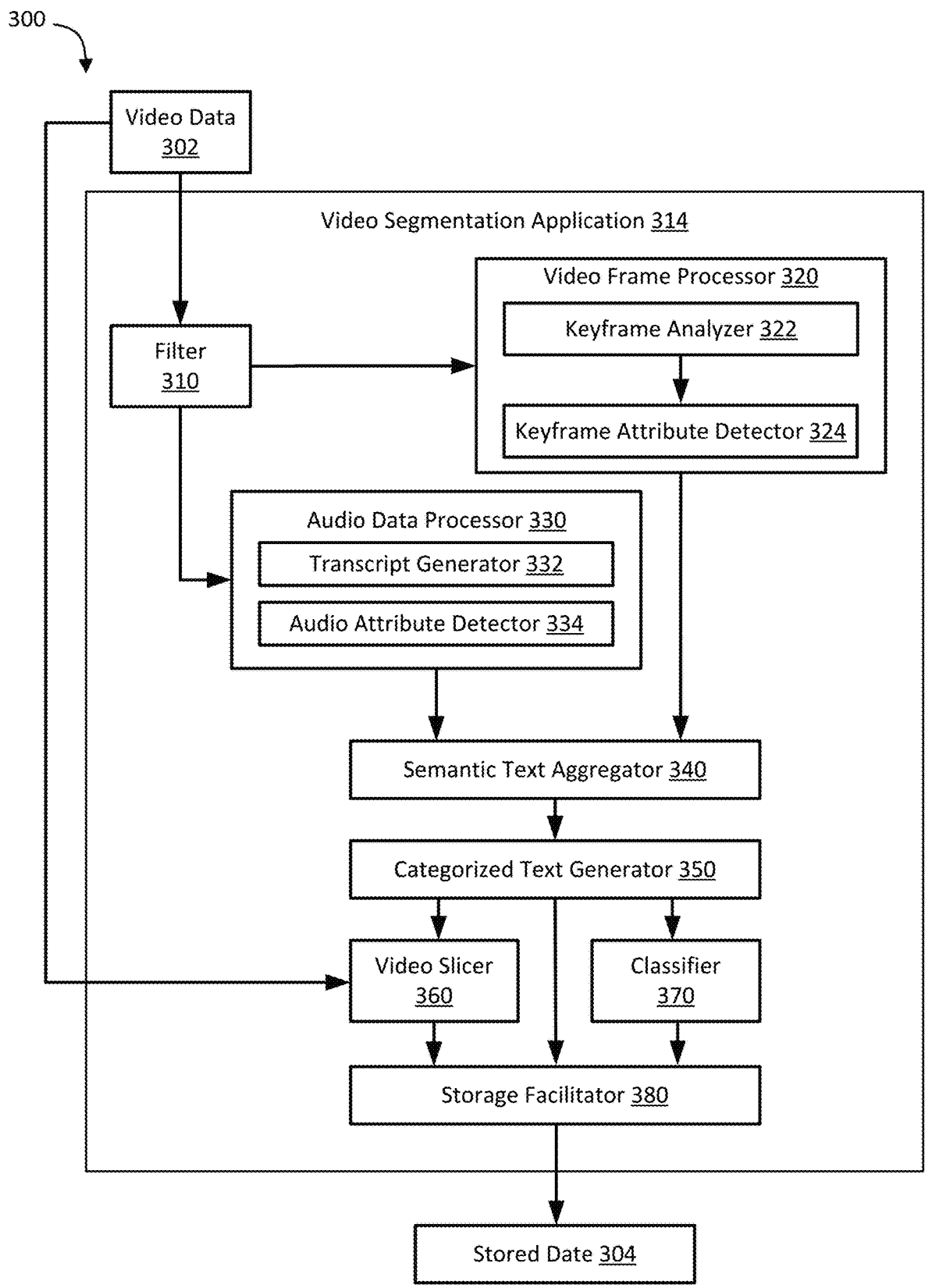
FIG. 3 shows a system block diagram of video segmentation components included in a video data management system, according to an embodiment.

The video data management application 212 can include a video segmentation application 214, which can be functionally and/or structurally similar to the video segmentation application 314 of FIG. 3, described further herein. The video data management application 212 can also include a video generator 216, which can be functionally and/or structurally similar to the video generator 416 of FIG. 4, described further herein.

The network interface 230 can be configured to connect to the network N2, which can be functionally and/or structurally similar to the network N1 of FIG. 1. For example, network N2 can use any of the communication protocols described above with respect to network N1 of FIG. 1.

In some instances, the compute device 201 can further include a display, an input device, and/or an output interface (not shown in FIG. 2). The display can be any display device by which the compute device 201 can output and/or display data (e.g., via a user interface that is structurally and/or functionally similar to the user interface 102 of FIG. 1). The input device can include a mouse, keyboard, touch screen, voice interface, and/or any other hand-held controller or device or interface via which a user may interact with the compute device 201. The output interface can include a bus, port, and/or other interfaces by which the compute device 201 may connect to and/or output data to other devices and/or peripherals. Alternatively or in addition, the compute device 201 can cause display of data and/or receive data via another compute device (e.g., that is functionally and/or structurally similar to the compute device 110) that includes a display and/or input device.

FIG. 3 shows a system block diagram of video segmentation components 300 included in a video data management system. The video segmentation components 300 can be associated with a compute device (e.g., a compute device that is structurally and/or functionally similar to the compute device 201 of FIG. 2 and/or the compute devices 110 and/or 120 of FIG. 1). In some instances, for example, the video segmentation components 300 can include software stored in memory 210 and configured to execute via the processor 220 of FIG. 2. In some instances, for example, at least a portion of the video segmentation components 300 can be implemented in hardware. The video segmentation components 300 include video data 302, a video segmentation application 314 (e.g., that is functionally and/or structurally similar to the video segmentation application 214 of FIG. 2), and stored data 304. The video segmentation application 314 includes a filter 310, a video frame processor 320, an audio data processor 330, a semantic text aggregator 340, a categorized text generator 350, a video slicer 360, a classifier 370, and a storage facilitator 380. The video segmentation application 314 can be configured to analyze video content included in the video data 302, segment the video content to produce video segments, and facilitate storage of the video segments such that the video segments can be retrieved during video generation (as described at least in relation to FIG. 4 herein).

The video data 302 can include video content that includes at least one of a plurality of video frames, audio data, and/or subtitle text data (e.g., text data extracted from subtitle metadata having a plurality of timestamps (e.g., timestamp data) that is associated with a plurality of timestamps (e.g., timestamp data) of the plurality of video frames). The video data 302 can depict a plurality of scenes and/or include a plurality of segments. The video data 302 can be sourced from and/or be associated with, for example, publicly available content, user-generated content ("UGC"), influencer content, etc., from social media platforms and/or the like; brand-owned creator and/or marketing content; professionally produced content from studios, agencies, etc.; videos from stock video libraries; internal video content libraries maintained by companies for corporate use; synthetic videos generated by machine learning models (e.g., OpenAI® Sora, Runway Gen-2, Stable Video Diffusion, etc.); and/or the like.

The filter 310 can be configured to separate the video data 302 into a plurality of video frames and audio data. In some instances, the video data 302 can exclude audio data (e.g., the video data 302 can be a silent video clip), and the video data 302 can be provided as input to the video frame processor 320 without being processed by the filter 310. In some instances, although not shown in FIG. 3, the video data 302 can include subtitle text data and/or other text data that is (1) embedded and/or depicted in the plurality of video frames (e.g., text overlay) and/or (2) represented by metadata (e.g., a SubRip Subtitle (SRT) file, etc.) that is included in the video data 302. For example, the video segmentation application 314 can include a machine learning model that is configured to perform optical character recognition (e.g., text overlay extraction) to produce text overlay data based on a text overlay depicted within the video data 302. The text from the subtitle text data and/or other text data can be included in aggregated text data produced by the semantic text aggregator 340, described further herein.

The plurality of video frames selected from the video data 302 via the filter 310 can be provided as input to the video frame processor 320, which can include a keyframe analyzer 322 and a keyframe attribute detector 324. The keyframe analyzer 322 can include, for example, a PySceneDetect model and/or the like that is configured to identify a keyframe from the plurality of video frames. A keyframe can include, for example, a frame associated with a beginning of a scene, a transition between scenes, and/or an end of a scene. More specifically, a keyframe can be associated with a change (e.g., a change across at least two video frames from the plurality of video frames) in lighting, brightness, color, motion, etc., as depicted by the at least two video frames. In some instances, a keyframe can be the first video frame after (or a frame that is predetermined number of video frames after) a detected scene change that is determined by lighting, brightness, color, motion, etc. In some instances, the keyframe analyzer 322 can generate a first timestamp that is associated with a start of a first scene depicted within the plurality of video frames and a second timestamp that is associated with an end of that first scene, based on, respectively, a first keyframe associated with that first scene and a second keyframe associated with a second scene that is depicted after the first scene within the plurality of video frames. Timestamp data associated with a keyframe(s) can be used to associate the keyframe(s) with text data produced by the keyframe analyzer 322 and/or the keyframe attribute detector 324, each of which is described further below.

The keyframe analyzer 322 can be further configured to generate text data that is descriptive of a depiction of the identified keyframe(s). More specifically, the keyframe analyzer 322 can include an image-to-text model (e.g., a Bootstrapping Language-Image Pre-training (BLIP) model and/or the like) that can receive a keyframe as input to automatically (e.g., without human intervention) produce keyframe text data that describes (e.g., in human readable language) a scene depicted by the keyframe. For example, the keyframe analyzer 322 can generate the text "two dogs playing in the snow", based on a keyframe that depicts two dogs playing in the snow.

The video frame processor 320 can also include a keyframe attribute detector 324, which can be configured to analyze and/or evaluate a predetermined attribute(s) of a keyframe that is identified by the keyframe analyzer 322. A predetermined attribute can include, for example, whether a human is depicted in the keyframe, a number of humans depicted in the keyframe, a depicted human's age, a depicted human's gender, whether the keyframe depicts an indoor and/or outdoor scene, etc. The keyframe attribute detector 324 can be configured to output keyframe attribute text data (e.g., human readable text data) that represents a value and/or determination for a predetermined attribute(s) of the keyframe.

Referring back to the filter 310 described above, audio data produced and/or extracted from the video data 302 can be sent as input to the audio data processor 330, which can include a transcript generator 332 and an audio attribute detector 334. The transcript generator 332 can be configured to generate transcript text data (e.g., human readable text) that represents a transcription of speech data (e.g., human speech data, synthetic and/or virtual speech data, etc.) included in the audio data. The transcript generator 332 can include a speech-to-text transcription model, such as a Whisper model and/or the like. The audio attribute detector 334 can include a machine learning model that is configured to receive the audio data as input to evaluate a predetermined audio attribute(s), such as tone of voice, number of entities (e.g., humans) that are audible within the audio data, gender and/or age of a human speaker, etc. More specifically, the audio attribute detector 334 can determine, based on the audio data, audio features such as, for example, Mel frequency cepstral coefficients (MFCCs), spectral centroid (SC), spectral bandwidth (SB), audio pitch, audio energy, audio loudness, and/or the like. The audio attribute detector 334 can include, for example, a random forest regressor and/or the like that is configured to perform feature reduction by transforming high-dimensional data into a lower-dimensional subspace and determining the importance of each feature for predicting an attribute. The audio attribute detector 334 can be further configured to produce audio attribute text data (e.g., human readable text) that represents a determination(s) of the predetermined audio attribute(s). The audio data processor 330 can be configured to associate a timestamp (e.g., a timestamp included in the video data 302) with text data produced by (1) the transcript generator 332 and/or (2) the audio attribute detector 334.

The keyframe text data, the keyframe attribute text data, the transcript text data, the audio attribute text data, the subtitle text data, and/or the text overlay data can be combined by the semantic text aggregator 340 to produce semantic text data. The semantic text aggregator 340 can sync and/or align text data generated by different components (e.g., the keyframe analyzer 322, the keyframe attribute detector 324, the transcript generator 332, the audio attribute detector 334, etc.) based on the timestamps that are included in the video data 302 and associated with the text data generated by each of these components.

In some instances, although not shown in FIG. 3, the video segmentation application 314 can be configured to identify and extract verbal video data and non-verbal video data that are included in the video data 302 based on the semantic text data produced by the semantic text aggregator 340. For example, nonverbal video data (e.g., start and end timestamps) can be identified within the video data 302 based on transcript text data indicating an absence of speech between identified keyframes (e.g., between the start and end timestamps) and/or for at least a predetermined time period. Alternatively or in addition, nonverbal video data can be identified based on at least one of (1) the keyframe text data and/or the keyframe attribute text data indicating that no humans are depicted in a keyframe associated with the nonverbal video data and/or (2) an absence of subtitle text data and/or text overlay for at least a predetermined time period. In some embodiments, nonverbal video data can be segmented by scene. Similarly stated, a nonverbal video segment can be video data associated with a keyframe identified by the keyframe analyzer 322. Each nonverbal video segment can be stored at a memory for later retrieval, as described further herein at least in relation to the storage facilitator FIG. 4. Remaining verbal video data from the video data 302 can be associated with verbal sematic text data within the semantic text data that is produced by the semantic text aggregator 340.

The semantic text data (or a subset of the semantic text data, such as the verbal semantic text data described above) can be received by the categorized text generator 350 to produce categorized text data. The categorized text generator 350 can include a machine learning model (e.g., a large language model, a transformer model, and/or the like) that is configured to categorize the semantic text data based on a classification indication, which can include, for example, a predefined taxonomy.

A predefined taxonomy can include, for example, an indication of an order of a video segment within a plurality of video segments. To illustrate, an example taxonomy can be associated with a paid advertisement and can have the following categories: (1) a hook category (e.g., associated with a video segment that is "eye-catching" and/or that attracts consumer attention); (2) a problem statement category (e.g., associated with a video segment that shows an issue and/or need that a product addresses); (3) a solution statement category (e.g., associated with a video segment that shows a capability and/or benefit of the product the resolves the issue and/or need shown in the problem segment); (4) a solution proof category (e.g., a social proof category, which can be associated with a video segment that shows users using the product to demonstrate the product's effectiveness); and/or (5) a call to action (CTA) video category (e.g., associated with a video segment that instructs a viewer on what to expect and/or what to do next).

To further illustrate, an example taxonomy can be associated with a teaser video and can have a hook category, a product unboxing and/or setup category, a product features and/or benefits category, and/or a CTA category. As yet a further example, a taxonomy can be associated with a testimonial video and can have (1) an introduction category (e.g., associated with a video segment that shows a testifier providing background on themselves); (2) a problem statement category; (3) a solution statement category; (4) an experience and/or benefits category; (5) a results category; and/or (6) a CTA category.

In some instances, a taxonomy category can indicate an order of a video segment within a series of video segments. For example, within a paid advertisement video, a hook video segment can precede a problem statement video segment, the problem statement video segment can precede a solution statement video segment, the solution statement video segment can precede a proof video segment, and the proof video segment can precede a CTA video segment. In some instances, a series of video segments can include two or more segments that are associated with a common category (e.g., two hook video segments). In some instances, a scene (e.g., as identified by the keyframe analyzer 322) can be associated with one or more taxonomy categories. For example, a first portion of a scene can be associated with a first taxonomy category, and a second portion of the scene can be associated with a second taxonomy category that is different from the first taxonomy category. In some instances, a video segment can be associated with no predefined taxonomy category. In these instances, the video segment can be classified as, for example, "other" and/of "B-roll" and can be used during a video generation and/or video editing process, as described further herein at least in relation to FIG. 4.

The categorized text generator 350 can segment the semantic text data to produce the categorized text data, which can include a plurality of text data segments, where a text data segment from the plurality of text data segments is associated with a taxonomy category. Each text data segment can be associated with timestamps that indicate the associated video segment within the video data 302. The video slicer 360 can receive these timestamps as input to slice and/or retrieve the associated video segment (e.g., the plurality of video frames and/or the audio data) from the video data 302. This video segment, in addition to the taxonomy classification and a semantic vector (described below) can be provided to the storage facilitator 380 to cause the video segment and metadata to be stored at a location of a memory, as described further herein.

The categorized text data associated with a video segment can be provided as input to the classifier 370, which can include a text embedding model (e.g., a GPT embedding model, a CLIP embedding model, a sentence transformer model, and/or the like). The text embedding model can generate a semantic vector (e.g., an embedding, embedded data, etc.) that represents a semantic meaning(s) of the categorized text data associated with the video segment. For example, the semantic vector can include a numerical indication of an object (and/or a feature(s) of the object, such as an age and/or gender of a speaker, a color of a T-shirt, etc.) depicted in the video segment, a setting (e.g., outdoors, indoors, mountain background, etc.) depicted in the video segment, etc.

The metadata can include, for example, an indication of the taxonomy classification (generated by the categorized text generator 350) associated with the video segment, an indication of orientation (e.g., portrait or landscape) of the video segment, frame rate of the video segment, resolution of the video segment, frame rate of the video segment, etc. The storage facilitator 380 can be configured to cause storage of the video segment and the metadata (collectively, the stored data 304) at a location of a memory (e.g., a database that is functionally and/or structurally similar to the database 130 of FIG. 1). The location can be determined based on the semantic vector generated by the classifier 370. For example, the memory can be configured for semantic vector search, where each video segment and the associated metadata is organized in the memory based on the associated semantic vector. As described further herein at least in relation to FIG. 4, the stored data 304 can then be retrieved based on a comparison between a search query and the semantic vector, such that the video segment included in the stored data 304 can be included in a generated video.

As described above, in some instances, the video segmentation application 314 can process nonverbal video segments differently than verbal video segments. For example, the video segmentation application 314 can identify nonverbal video segments within the video data 302 based on the semantic text data generated by the semantic text aggregator 340, and the video slicer 360 can extract the nonverbal video segment from the video data 302 based on timestamps within the semantic text data. Although not shown in FIG. 3, the video segmentation application 314 can include a machine learning model (e.g., a visual embedding model, such as CLIP and/or the like) that is configured to generate a semantic vector for the nonverbal video segment. A semantic vector can include, for example, a real-valued vector that encodes the meaning of a video segment, such that video segments that are closer in a vector space are similar in meaning. The storage facilitator 380 can then cause the nonverbal video segment to be stored at a memory location of a database, where that memory location is determined by the semantic vector. In some instances, the storage facilitator 380 can cause verbal video segments to be stored at a first database (or at a first portion of a database) and nonverbal video segments to be stored at a second database that is different from the first data (or at a second portion of the database that is different from the first portion of the database).

In some instances, building and/or managing large video models (LVMs) can involve significant computational resources and/or data handling. To improve resource utilization, the stored data 304, including video segments, metadata, and semantic vectors, can be associated with a plurality of LVMs. The video segmentation application 314 can generate the stored data 304 to train the plurality of LVMs in a tiered construction approach. In addition to optimizing resource utilization, the tiered construction approach can also improve model relevance across various use cases.

An example tiered configuration of LVMs can include a foundational model, a use case specific model, and a private enterprise model. The video segmentation application 314 can construct the foundational LVM using video data 302 that is derived from widely available video sources, such as user-generated content on social media platforms. The scale of this dataset can range, for example, from millions to hundreds of millions of videos, providing a diverse base for initial model training. The foundational model can capture general video semantics and structures that are common across various types of content.

The use case specific model can be configured for specialized and/or niche use cases and can be tailored to enhance specific outcomes. More specifically, the video segmentation application 314 can build a specialized model on top of the foundation model using both open-source and proprietary video datasets that are rich in use case-specific content. The use case specific model tier can leverage a tailored taxonomy defined to reflect the unique characteristics and requirements of the particular use case, enhancing the model's generation of relevant and/or contextually relevant video segments.

The private enterprise model can be configured for an individual organization based on that organization's internal video assets. The private enterprise model can build upon the use case-specific model by integrating the organization's unique video content (e.g., organization data not used in models outside of the organization) and/or using a refined, use case-specific taxonomy that includes additional and/or different categories (e.g., relative to a base set of categories associated with the foundational model) that are specific to the enterprise. This customization can facilitate highly personalized video generation, catering to the specific needs and strategic objectives of the organization.

In some implementations, at least some machine learning models (e.g., large language models, etc.) described herein can be located and/or controlled locally with the video segmentation application 314. Alternatively or in addition, in some implementations, at least some machine learning models (e.g., large language models) can be remote (as to the video segmentation application 314) and/or controlled by an entity that is different from the video segmentation application 314. The video segmentation application 314 can access these remote machine learning models via application programming interface (API) calls.

Figure 4:
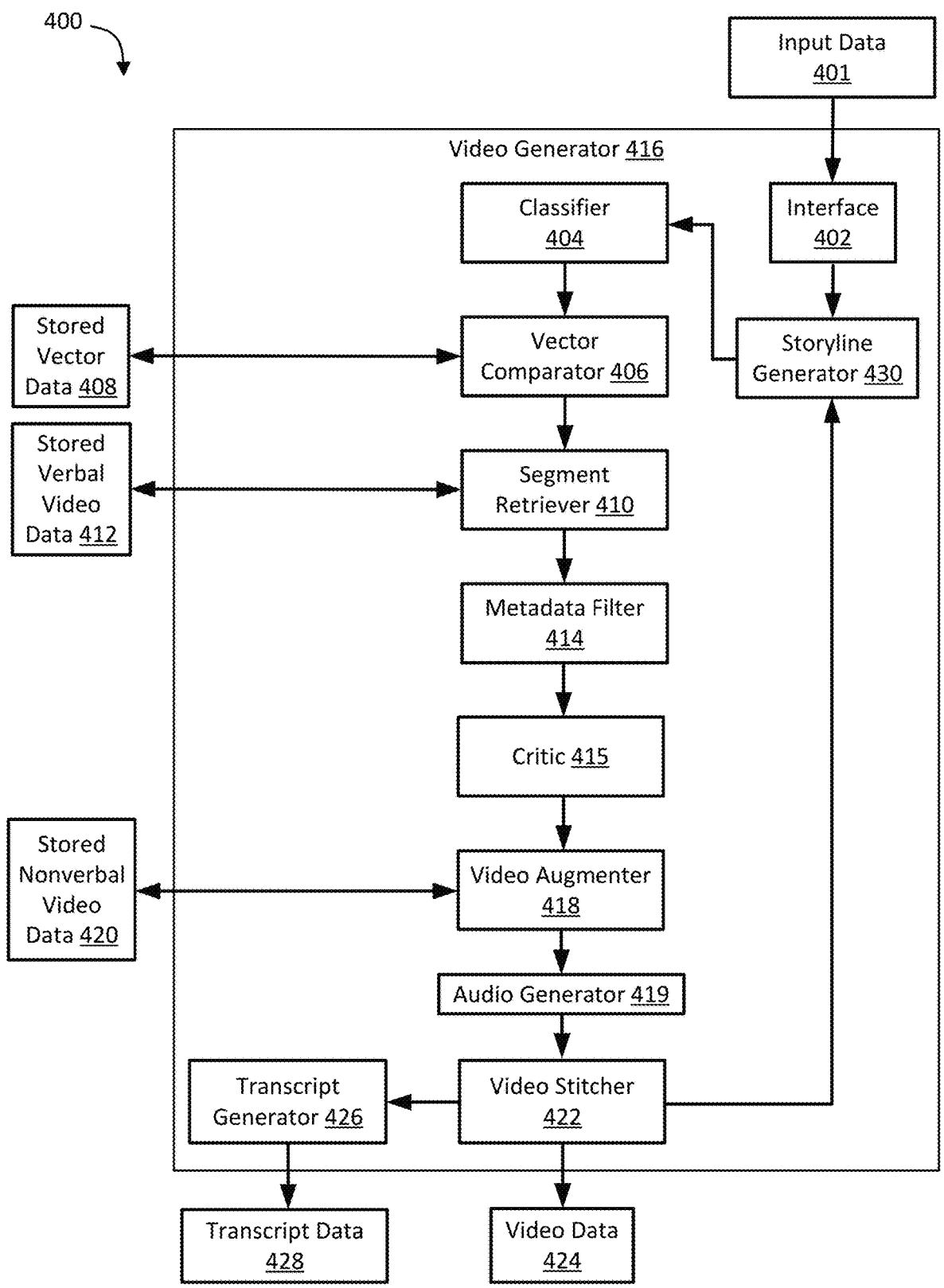
FIG. 4 shows a system block diagram of video generator components included in a video data management system, according to an embodiment.

FIG. 4 shows a system block diagram of video generator components 400 included in a video data management system, according to an embodiment. The video generator components 400 can be associated with a compute device (e.g., a compute device that is structurally and/or functionally similar to the compute device 201 of FIG. 2 and/or the compute devices 110 and/or 120 of FIG. 1). In some instances, for example, the video generator components 400 can include software stored in memory 210 and configured to execute via the processor 220 of FIG. 2. In some instances, for example, at least a portion of the video generator components 400 can be implemented in hardware. The video generator components 400 include input data 401, stored vector data 408, stored verbal video data 412, a video generator 416, stored nonverbal video data 420, video data 424, and transcript data 428. The video generator 416 includes an interface 402 (which can be structurally and/or functionally similar to the user interface 102 of FIG. 1), a classifier 404, a vector comparator 406, a segment retriever 410, a metadata filter 414, a critic 415, a video augmenter 418, a video stitcher 422, video data 424, a transcript generator 426, and a storyline generator 430. In some implementations, the video generator components 400 can include and/or interact with the video segmentation components 300 of FIG. 3, and/or vice versa.

The video generator 416 can be configured to retrieve stored video segments that can be produced for example using a video segmentation application that is structurally and/or functionally similar to the video segmentation application 314 of FIG. 3. The video generator 416 can perform this retrieval in response to receiving input data 401 via the interface 402 (e.g., a graphical user interface (GUI) executed via a user compute device that is structurally and/or functionally similar to the compute device 110). The input data can include, for example, a text prompt (e.g., a text query) that is defined by a user and describes, summarizes, and/or outlines a desired video (e.g., the to-be-generated video data 424). For the purpose of illustration, an example text prompt can be "a male actor and a female actor apply sunscreen on a beach, the actors go swimming in the ocean, an animation shows a sunscreen layer maintaining adherence on skin in the presence of water, and the male and female actor are shown smiling." Alternatively or in addition, the input data 401 can include an image(s) (e.g., an image query) that depicts a theme, a style, and/or content of the desired video. For example, an image can depict a bottle of waterproof sunscreen on a beach.

The input data 401 can be received via the interface 402 by the storyline generator 430, which can include a machine learning model (e.g., a large language model, a transformer model, and/or the like) configured to produce storyline data. The storyline data can indicate a more detailed summary of the to-be-generated video than the general outline indicated by the input data 401. Alternatively or in addition, the storyline generator 430 can include an image-to-text model (e.g., BLIP and/or the like) that can generate text data (e.g., outline data and/or storyline data) based on an image included in the input data 401. The storyline data can also indicate a taxonomy classification of a video segment to be included in the generated video. For example, to generate a purchased advertisement video, the storyline data can indicate that the first video segment to be included in the generated video is to be associated with a hook taxonomy classification. The storyline generator 430 can be configured to generate storyline data iteratively as video segments are selected for inclusion in the generated video, as described further herein. For example, after the first video segment being associated with the hook taxonomy classification is included in the generated video, the storyline generator 430 can generate updated storyline data to indicate that the next video segment to be included in the generated video is to have a problem statement taxonomy classification.

The storyline data generated based on the input data 401 can be received by the classifier 404 to produce a semantic vector that represents a semantic(s) of the storyline data. The classifier 404 can include a text-to-embedding model and/or an image-to-embedding model. In some instances, the classifier 404 can be the classifier 370 of FIG. 3 and/or can be jointly trained with the classifier 370, such that the semantic vector generated by the classifier 404 can be compared (e.g., by the vector comparator 406, described further herein) with a semantic vector(s) generated by the classifier 370 (e.g., a semantic vector(s) included in the stored vector data 408). Similarly stated, the respective semantic vectors generated by the classifier 404 and the classifier 370 can be associated with a common latent (e.g., embedding) space.

A semantic vector included in the stored vector data 408 can be associated with one or more verbal video segments included in the stored verbal video data 412. More specifically, the stored verbal video data 412 can be stored within a database (e.g., a database functionally and/or structurally similar to the database 130 of FIG. 1) that is configured for semantic search, and the semantic vector can define a memory location of the one or more stored verbal video segments within the database. The vector comparator 406 can be configured to determine, for example, a cosine similarity value between the semantic vector generated by the classifier 404 (e.g., a search query) and the semantic vector included in the stored vector data 408. Based on the cosine similarity value being less than a predetermined threshold, the vector comparator 406 can cause the segment retriever 410 to retrieve the one or more verbal video segments that is (1) included in the stored vector data 408 and (2) associated with the semantic vector included in the stored verbal video data 412. In some instances, the segment retriever 410 can retrieve a predetermined number of verbal video segments having associated semantic vectors that have the lowest cosine similarity values as measured against the semantic vector generated by the classifier 404.

The segment retriever 410 can provide the one or more verbal video segments to the metadata filter 414, which can identify a verbal video segment(s) (if any) from the one or more verbal video segments that is associated with the metadata indicated by the storyline data generated by the storyline generator 430. As described above, the metadata for a verbal video segment from the one or more verbal video segments can indicate, for example, the taxonomy classification for that verbal video segment (e.g., as determined by a categorized text generator (not shown in FIG. 4) that is functionally and/or structurally similar to the categorized text generator 350 of FIG. 3). The metadata filter 414 can select the verbal video segment(s) from the one or more verbal video segments based on a match between the metadata associated with that verbal video segment(s) and the indication of the metadata within the storyline data, and the verbal video segment(s) can be provided to the critic 415 for further down-selection. In some instances, if the one or more verbal video segments is a plurality of verbal video segments, the metadata filter 414 can select a predetermined number of verbal video segments from the one or more verbal video segments that most closely match the indication of the metadata within the storyline data (e.g., the top five verbal video segments, the top 10 verbal video segments, etc.). In some instances, the metadata can indicate a video segment length, an orientation, a resolution, etc., for a video segment, and the metadata filter 414 can select a verbal video segment(s) based on user defined values for video segment length, total generated video length, orientation, resolution, etc.

The critic 415 can be a machine learning model (e.g., a transformer model and/or the like) that can be configured to determine a verbal video segment (if any) from the verbal video segment(s) provided by the metadata filter 414 that best matches and/or sufficiently matches the storyline data. In some instances, the critic 415, the metadata filter 414, and/or the segment retriever 410 can exclude any verbal video segments from being selected if, for example, (1) the stored vector data 408 does not include a semantic vector that has a sufficiently small cosine similarity value as compared to the semantic vector generated by the classifier 404, (2) the one or more verbal video segments selected by the segment retriever 410 is not associated with metadata that is indicated by the storyline data, and/or (3) the verbal video segment(s) selected by the metadata filter 414 does not sufficiently match the storyline data. In these instances, the video augmenter 418 can cause retrieval of a nonverbal video segment from the stored nonverbal video data 420, where the nonverbal video segment is associated with a semantic vector that indicates that the nonverbal video segment matches the storyline data. For example, in some implementations, this semantic vector can have a cosine similarity value, as measured against the semantic vector generated by the classifier 404, that is below a predetermined threshold.

The audio generator 419 can include a machine learning model that is configured to receive a video segment as input and generate voiceover audio data and/or music audio data for that video segment. In some instances, the video segment can be a verbal video segment, and audio data generated by the audio generator 419 can be presented to a user for a user to choose whether to include the audio data in the generated video. In some instances, the video segment can be a nonverbal video segment, and the audio generator 419 can automatically (e.g., without human intervention) cause the audio data to be included in a portion of the generated video that is associated with the nonverbal video segment.

The video stitcher 422 can be configured to receive a verbal video segment from the critic 415 or a nonverbal video segment from the video augmenter 418 and (1) add that verbal or nonverbal video segment to the video data 424 and/or (2) append that verbal or nonverbal video segment to a previously selected verbal and/or nonverbal segment(s) that is already included in the video data 424. The transcript generator 426 can include a machine learning model (e.g., a large language model) that can receive at least a portion of the video data 424 generated by the video stitcher 422 and produce transcript data 428 for that portion of the video data 424. The portion of the video data 424 can include, for example, a nonverbal video segment selected by the video augmenter 418 from the stored nonverbal video data 420.

The video stitcher 422 can also cause the storyline generator 430 to generate updated storyline data based on the video segment(s) added to the video data 424. The video generator 416 can use the updated storyline data to iteratively add additional verbal and/or nonverbal video segments to the video data 424 until the video data 424 includes a video segment(s) for each desired taxonomy classification. After the iterating, the video generator 416 can cause the video data 424 to be sent (e.g., via the interface 402) to a user compute device for display and/or additional editing. For example, the interface 402 can be configured to cause display of a source(s) associated with the verbal and/or nonverbal segments included in the video data 424, such that a user can retrieve an additional video segment(s) from that source(s) to manually edit the generated video data 424. In some instances, the interface 402 can identify a gap(s) in the video data 424 if, for example, the video generator 416 does not identify a video segment(s) that satisfies the storyline data. In these instances, the interface 402 can indicate the gap(s) to the user, permitting the user to manually identify a video segment(s) to fill the gap(s) in the generated video.

In some implementations, at least some machine learning models (e.g., large language models, etc.) described herein can be located and/or controlled locally with the video generator 416. Alternatively or in addition, in some implementations, at least some machine learning models (e.g., large language models) can be remote (as to the video generator 416) and/or controlled by an entity that is different from the video generator 416. The video generator 416 can access these remote machine learning models via application programming interface (API) calls.

Figure 5:
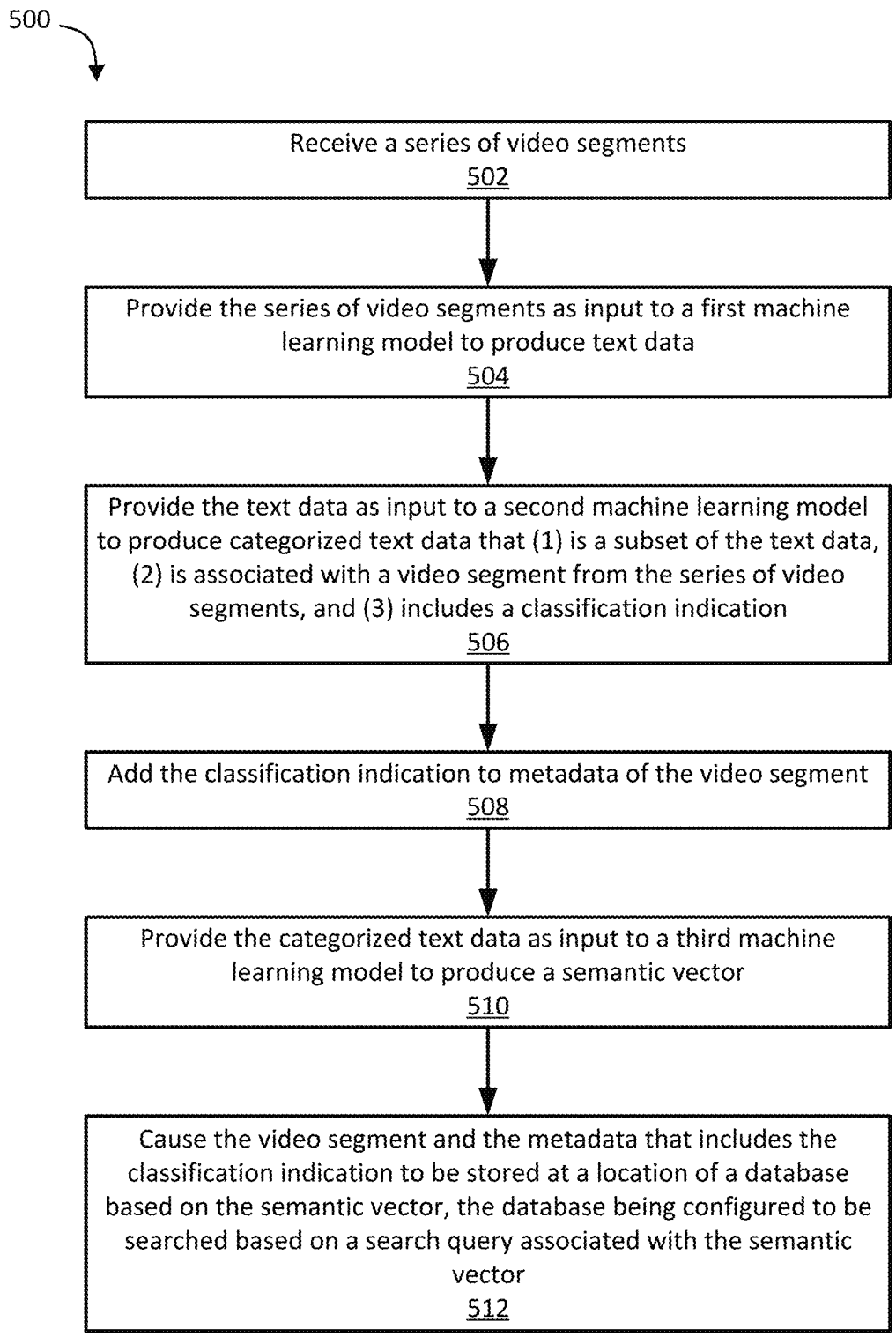
FIG. 5 shows a flow diagram illustrating a method implemented by a video data management system to cause a video segment and metadata to be stored at a location of a database, according to an embodiment.

FIG. 5 shows a flow diagram illustrating a method 500 implemented by a video data management system, according to an embodiment. The method 500 can be implemented by a video data management system described herein (e.g., the video data management system 100 of FIG. 1). Portions of the method 500 can be implemented using a processor (e.g., the processor 220 of FIG. 2) of any suitable compute device (e.g., the compute device 201 of FIG. 2 and/or the compute device 120 of FIG. 1).

The method 500 at 502 includes receiving, at a processor, a series of video segments and, at 504, providing, via the processor, the series of video segments as input to a first machine learning model to produce text data. The text data is provided as input at 506, via the processor, to a second machine learning model to produce categorized text data that (1) is a subset of the text data, (2) is associated with a video segment from the series of video segments, and (3) includes a classification indication. At 508, via the processor, the classification indication is added to metadata of the video segment, and at 510, the categorized text data is provided as input, via the processor, to a third machine learning model to produce a semantic vector. The method 500 also includes at 512 causing, via the processor, the video segment and the metadata that includes the classification indication to be stored at a location of a database based on the semantic vector, the database being configured to be searched based on a search query associated with the semantic vector.

Figure 6:
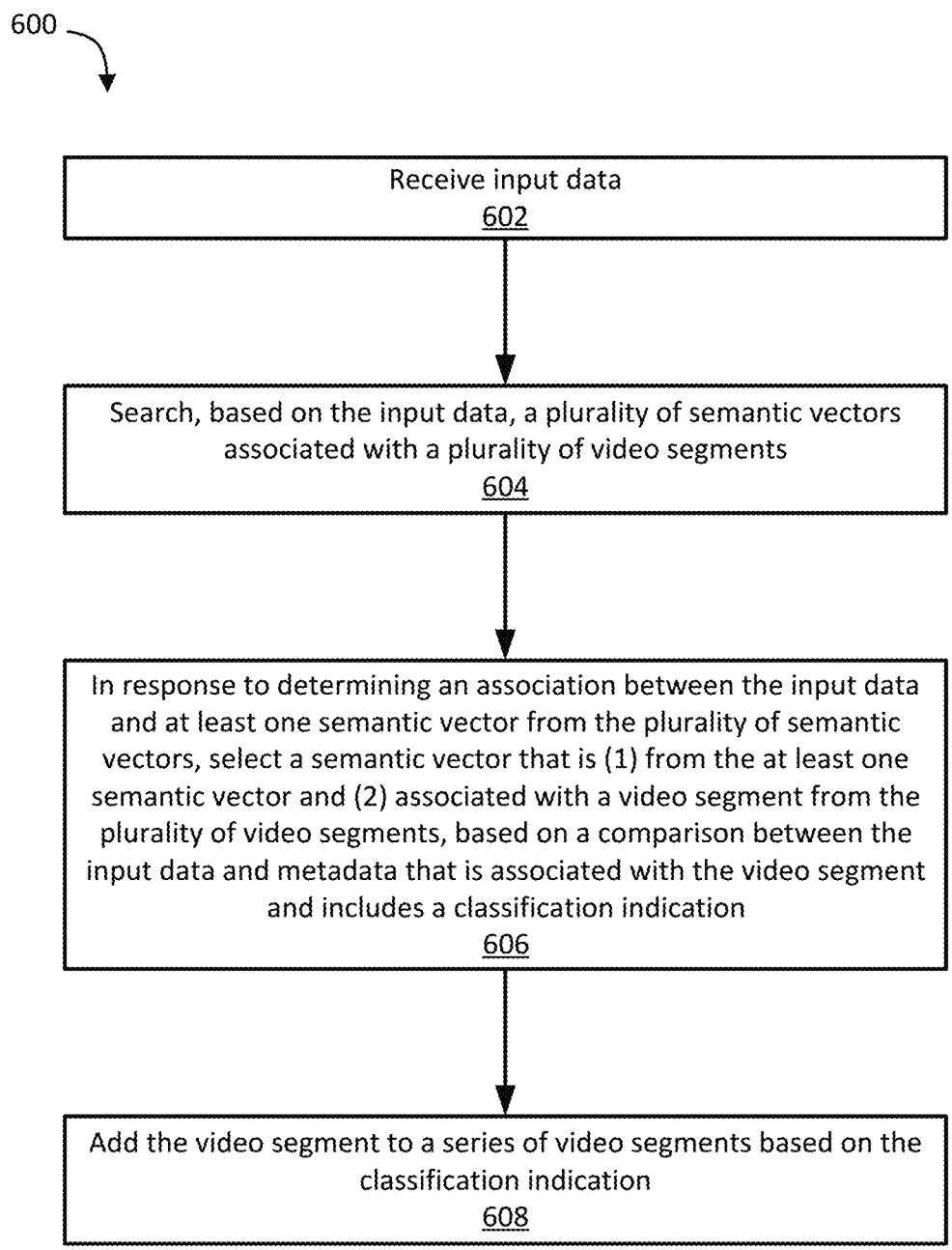
FIG. 6 shows a flow diagram illustrating a method implemented by a video data management system to add a video segment to a series of video segments, according to an embodiment.

FIG. 6 shows a flow diagram illustrating a method 600 implemented by a video data management system, according to an embodiment. The method 600 can be implemented by a video data management system described herein (e.g., the video data management system 100 of FIG. 1). Portions of the method 600 can be implemented using a processor (e.g., the processor 220 of FIG. 2) of any suitable compute device (e.g., the compute device 201 of FIG. 2 and/or the compute devices 110 and/or 120 of FIG. 1).

The method 600 at 602 includes receiving input data and, at 604, searching, based on the input data, a plurality of semantic vectors associated with a plurality of video segments. In response to determining an association between the input data and at least one semantic vector from the plurality of semantic vectors, at 606, the method 600 includes selecting a semantic vector that is (1) from the at least one semantic vector and (2) associated with a video segment from the plurality of video segments, based on a comparison between the input data and metadata that is associated with the video segment and includes a classification indication. The video segment is included in a series of video segments at 608 based on the classification indication.

Figure 7:
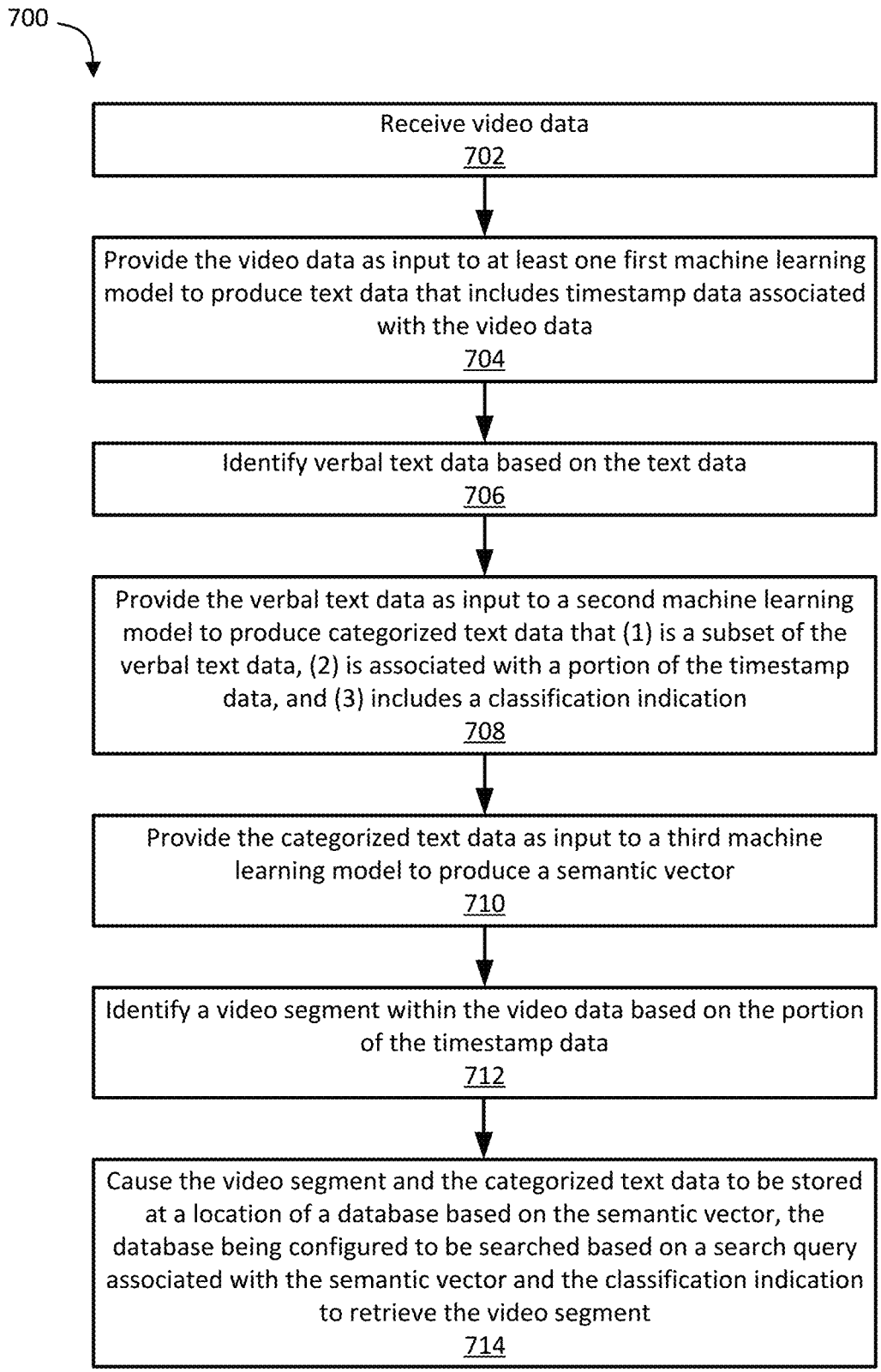
FIG. 7 shows a flow diagram illustrating a method implemented by a video data management system to cause a video segment and categorized text data to be stored at a location of a database, according to an embodiment.

FIG. 7 shows a flow diagram illustrating a method 700 implemented by a video data management system, according to an embodiment. The method 700 can be implemented by a video data management system described herein (e.g., the video data management system 100 of FIG. 1). Portions of the method 700 can be implemented using a processor (e.g., the processor 220 of FIG. 2) of any suitable compute device (e.g., the compute device 201 of FIG. 2 and/or the compute devices 110 and/or 120 of FIG. 1).

The method 700 at 702 includes receiving video data and, at 704, providing the video data as input to at least one first machine learning model to produce text data that includes timestamp data associated with the video data. At 706, the method 700 includes identifying verbal text data based on the text data. At 708, the verbal text data is provided as input to a second machine learning model to produce categorized text data that (1) is a subset of the verbal text data, (2) is associated with a portion of the timestamp data, and (3) includes a classification indication. The categorized text data is provided as input to a third machine learning model at 710 to produce a semantic vector, and a video segment is identified within the video data at 712 based on the portion of the timestamp data. The method 700 at 714 includes causing the video segment and the categorized text data to be stored at a location of a database based on the semantic vector, the database being configured to be searched based on a search query associated with the semantic vector and the classification indication to retrieve the video segment.

According to an embodiment, a method includes receiving, at a processor, a series of video segments and providing, via the processor, the series of video segments as input to a first machine learning model to produce text data. The text data is provided as input, via the processor, to a second machine learning model to produce categorized text data that (1) is a subset of the text data, (2) is associated with a video segment from the series of video segments, and (3) includes a classification indication. Via the processor, the classification indication is added to metadata of the video segment, and the categorized text data is provided as input, via the processor, to a third machine learning model to produce a semantic vector. The method also includes causing, via the processor, the video segment and the metadata that includes the classification indication to be stored at a location of a database based on the semantic vector, the database being configured to be searched based on a search query associated with the semantic vector.

In some implementations, the method can further include receiving, at the processor, video data and generating, via the processor, the series of video segments from the video data based on at least one scene change indication within the video data. In some implementations, the text data can be first text data, and the method can further include receiving, at the processor, video data and generating, via the processor, the series of video segments from the video data based on at least one scene change indication within the video data. The method can also include identifying, via the processor, a keyframe for each video segment from the series of video segments based on a scene change indication from the at least one scene change indication. Additionally, the method includes providing, via the processor, the keyframe for each video segment as input to a fourth machine learning model to produce second text data, the first text data and the second text data provided as input to the second machine learning model to produce the categorized text data.

In some implementations, the first machine learning model can be configured to perform at least one of subtitle extraction or transcription to produce the first text data, and the fourth machine learning model can be configured to perform image-to-text generation to produce the second text data. In some implementations, the classification indication can be an indication of an order of the video segment within the series of video segments. In some implementations, the video segment can be a verbal video segment, the semantic vector can be a first semantic vector, the database can be a first database, and the search query can be a first search query. The method can further include identifying, via the processor, a non-verbal video segment from the series of video segments based on the text data. Additionally, the method can include providing, via the processor, at least one video frame from the non-verbal video segment as input to a fourth machine learning model to produce a second semantic vector. The method can also include causing, via the processor, the non-verbal video segment to be stored at a location of a second database based on the second semantic vector, the second database being configured to be searched based on a second search query associated with the second semantic vector. In some implementations, the search query can be at least one of a text query or an image query. In some implementations, the second machine learning model can be a large language model.

According to an embodiment, a non-transitory, machine-readable medium stores instructions that, when executed by a processor, cause the processor to receive input data and search, based on the input data, a plurality of semantic vectors associated with a plurality of video segments. In response to determining an association between the input data and at least one semantic vector from the plurality of semantic vectors, the instructions cause the processor to select a semantic vector that is (1) from the at least one semantic vector and (2) associated with a video segment from the plurality of video segments, based on a comparison between the input data and metadata that is associated with the video segment and includes a classification indication. The video segment is included in a series of video segments based on the classification indication.

In some implementations, the plurality of semantic vectors can be a first plurality of semantic vectors, the plurality of video segments can be a plurality of verbal video segments, and the video segment can be a verbal video segment. Additionally, the non-transitory, machine-readable medium can further store instructions to cause the processor to, in response to determining an absence of an association between the input data and the first plurality of semantic vectors, search a second plurality of semantic vectors based on the input data to identify a nonverbal video segment from a plurality of nonverbal video segments, the second plurality of semantic vectors being associated with the plurality of nonverbal video segments. The nonverbal video segment can be provided as input to a machine learning model to produce storyline data. The instructions can also cause the processor to include the nonverbal video segment in the series of video segments that includes the verbal video segment to produce an updated series of video segments. Video data can be generated based on the updated series of video segments and the storyline data. In some implementations, the instructions to cause the processor to select the semantic vector from the at least one semantic vector can include instructions to cause the processor to provide the at least one semantic vector and the input data as input to a machine learning model to select the semantic vector.

In some implementations, the machine-readable medium can further store instructions to cause the processor to receive at least one of a text prompt or an image prompt and provide the at least one of the text prompt or the image prompt as input to at least one machine learning model to produce the input data. In some implementations, the instructions cause the processor to search the plurality of semantic vectors can include instructions to cause the processor to determine at least one cosine similarity value based on the input data and the plurality of semantic vectors. In some implementations, the metadata can further include at least one of an orientation indication, a resolution indication, a video segment length indication, or a frame rate indication. The instructions to cause the processor to select the semantic vector can further include instructions to cause the processor to select the semantic vector based on a comparison between the input data and the at least one of the orientation indication, the resolution indication, the video segment length indication, or the frame rate indication. In some implementations, the video segment can be a first video segment, and the non-transitory, machine-readable medium can further store instructions to cause the processor to update the input data based on the video segment to produce updated input data. The instructions can also cause the processor to search, based on the updated input data, the plurality of semantic vectors to select a second video segment.

In some implementations, the video segment can be a first video segment, and the non-transitory, machine-readable medium can further store instructions to cause the processor to cause display of the series of video segments via a graphical user interface (GUI) of a user compute device. The instructions can also cause the processor to receive an indication of a second video segment from the user compute device in response to causing the display of the series of video segment, and the second video segment can be included in the series of video segments.

According to an embodiment, a non-transitory, machine-readable medium stores instructions that, when executed by a processor, cause the processor to receive video data and provide the video data as input to at least one first machine learning model to produce text data that includes timestamp data associated with the video data. The instructions also cause the processor to identify verbal text data based on the text data and provide the verbal text data as input to a second machine learning model to produce categorized text data that (1) is a subset of the verbal text data, (2) is associated with a portion of the timestamp data, and (3) includes a classification indication. The categorized text data is provided as input to a third machine learning model to produce a semantic vector, and a video segment is identified within the video data based on the portion of the timestamp data. Additionally, the instructions cause the processor to cause the video segment and the categorized text data to be stored at a location of a database based on the semantic vector, the database being configured to be searched based on a search query associated with the semantic vector and the classification indication to retrieve the video segment.

In some implementations, the portion of the timestamp data can be a first portion of the timestamp data, the semantic vector can be a first semantic vector, the video segment can be a first video segment, the database can be a first database, and the search query can be a first search query. The non-transitory, machine-readable medium can further store instructions to cause the processor to (1) identify nonverbal data based on the text data, the nonverbal data being associated with a second portion of the timestamp data and (2) identify a second video segment based on the second portion of the timestamp data. At least one keyframe can be identified based on the second video segment, and the at least one keyframe can be provided as input to a fourth machine learning to produce a second semantic vector. The instructions can also cause the second video segment to be stored at a location of a second database based on the second semantic vector, the second database being configured to be searched based on a second search query associated with the second semantic vector. In some implementations, the video data can include audio data, and the at least one first machine learning model can include a transcription model that is configured to receive the audio data as input to produce at least a portion of the text data. In some implementations, the classification indication can be an indication of an order of the video segment within a series of video segments.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A method, comprising:

receiving, at a processor, a series of video segments;

providing, via the processor, the series of video segments as input to a first machine learning model to produce text data;

providing, via the processor, the text data as input to a second machine learning model to produce categorized text data that (1) is a subset of the text data, (2) is associated with a video segment from the series of video segments, and (3) includes a classification indication;

adding, via the processor, the classification indication to metadata of the video segment;

providing, via the processor, the categorized text data as input to a third machine learning model to produce a semantic vector; and causing, via the processor, the video segment and the metadata that includes the classification indication to be stored at a location of a database based on the semantic vector, the database being configured to be searched based on a search query associated with the semantic vector.

2. The method of claim 1, further comprising:

receiving, at the processor, video data; and generating, via the processor, the series of video segments from the video data based on at least one scene change indication within the video data.

3. The method of claim 1, wherein the text data is first text data, the method further comprising:

receiving, at the processor, video data;

generating, via the processor, the series of video segments from the video data based on at least one scene change indication within the video data;

identifying, via the processor, a keyframe for each video segment from the series of video segments based on a scene change indication from the at least one scene change indication; and providing, via the processor, the keyframe for each video segment as input to a fourth machine learning model to produce second text data, the first text data and the second text data provided as input to the second machine learning model to produce the categorized text data.

4. The method of claim 3, wherein:

the first machine learning model is configured to perform at least one of text overlay extraction or transcription to produce the first text data; and the fourth machine learning model is configured to perform image-to-text generation to produce the second text data.

5. The method of claim 1, wherein the classification indication is an indication of an order of the video segment within the series of video segments.

6. The method of claim 1, wherein the video segment is a verbal video segment, the semantic vector is a first semantic vector, the database is a first database, and the search query is a first search query, the method further comprising:

identifying, via the processor, a non-verbal video segment from the series of video segments based on the text data;

providing, via the processor, at least one video frame from the non-verbal video segment as input to a fourth machine learning model to produce a second semantic vector; and causing, via the processor, the non-verbal video segment to be stored at a location of a second database based on the second semantic vector, the second database being configured to be searched based on a second search query associated with the second semantic vector.

7. The method of claim 1, wherein the search query is at least one of a text query or an image query.

8. The method of claim 1, wherein the second machine learning model is a large language model.

* * * * *